US012794605B2

(12) United States Patent
Takiguchi et al.

(10) Patent No.: US 12,794,605 B2
(45) Date of Patent: Nov. 10, 2026

(54) ERROR RATE MEASUREMENT APPARATUS AND ERROR RATE MEASUREMENT METHOD

(71) Applicant: ANRITSU CORPORATION, Kanagawa (JP)

(72) Inventors: Masashi Takiguchi, Kanagawa (JP); Takaki Fujiwara, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 114 days.

(21) Appl. No.: 19/056,861

(22) Filed: Feb. 19, 2025

(65) Prior Publication Data

US 2025/0310040 A1 Oct. 2, 2025

(30) Foreign Application Priority Data

Mar. 28, 2024 (JP) ................................ 2024-053442

(51) Int. Cl.

*H04L 1/20* (2006.01)
*H04L 25/03* (2006.01)
*H04L 25/49* (2006.01)

(52) U.S. Cl.

CPC ........ *H04L 1/203* (2013.01); *H04L 25/03006* (2013.01); *H04L 25/4917* (2013.01)

(58) Field of Classification Search

None

See application file for complete search history.

(56) References Cited

FOREIGN PATENT DOCUMENTS

JP 6025883 B2 11/2016

*Primary Examiner* — Guerrier Merant

(74) *Attorney, Agent, or Firm* — McDonald Hopkins LLC

(57) ABSTRACT

An error rate measurement apparatus 1 includes an error count unit 13*a* that calculates an error count value by determining an error with respect to expected symbol levels of a PAM signal with two or more levels; and a control unit 6 that adjusts and controls a threshold voltage for each interval between the symbol levels such that a first error count value and a second error count value for each interval between adjacent symbol levels calculated by the error count unit 13*a* are close to each other.

12 Claims, 5 Drawing Sheets

ERROR RATE MEASUREMENT APPARATUS AND ERROR RATE MEASUREMENT METHOD

TECHNICAL FIELD

The present invention relates to an error rate measurement apparatus that measures an error rate of a certain PAM signal with two or more levels including an NRZ signal and an error rate measurement method.

BACKGROUND ART

In the related art, in a case where bits of an NRZ signal with symbol levels consisting of two levels of 0 and 1 as shown in FIG. 6 are determined in an error rate measurement apparatus, it is necessary to specify a threshold voltage Vth that is a criterion for the determination. In general, as a method of obtaining the threshold voltage Vth, a method of sweeping the threshold voltage Vth once and selecting the threshold voltage Vth at which the best bit error rate (BER) is obtained from the swept threshold voltage Vth is used, and the method is expected to have the highest accuracy and has a simple algorithm.

On the other hand, the method has a disadvantage that real-time performance is poor, for example, because it is necessary to interrupt the measurement once to sweep the threshold voltage Vth, and because it is not possible to perform tracking in a case where the threshold voltage Vth of the signal that is measured may fluctuate during the process.

Therefore, the error rate measurement apparatus includes Auto Adjust as a function of estimating the threshold voltage Vth that is a criterion for the determination in real time. This takes an advantage of the fact that the optimum threshold voltage Vth is equal to an average direct current voltage value of the signal in the NRZ signal in which a mark ratio is uniform, such as a random pattern, and can be implemented by a low-pass filter for extracting an average direct current voltage of the signal, and an A/D converter: analog-to-digital converter (ADC) for detecting a voltage value thereof.

By the way, in the NRZ signal as shown in FIG. 6, one threshold voltage Vth is used, but in a case of a PAM4 signal with symbol levels consisting of four levels of 0, 1, 2, and 3 as shown in FIG. 5, three threshold voltages Vth_Upper, Vth_Middle, and Vth_Lower are required. Among these, only Vth_Middle is obtained by a direct current average, and Vth_Upper and Vth_Lower cannot be estimated. Therefore, although Auto Adjust is provided in the PAM4 signal, there is a problem that only Vth_Middle can be implemented in a current situation.

Here, as one of methods of estimating the Vth_Upper and the Vth_Lower, a method of estimating the threshold voltage Vth from a region in which a digital value of the A/D converter is saturated is considered, and the method is disclosed in patent document 1 below.

RELATED ART DOCUMENT

Patent Document

[Patent Document 1] Japanese Patent No. 6025883

DISCLOSURE OF THE INVENTION

Problem that the Invention is to Solve

However, in the PAM4 signal, the symbol levels 0, 1, 2, and 3 are not necessarily evenly distributed with respect to a peak-to-peak voltage of the signal, and for example, the middle of the symbol level 3 and the symbol level 2 is not necessarily optimal as the Vth_Upper, so that there is a problem that an error may occur in the estimation. In addition, in the method, since it is necessary to sweep the threshold voltage Vth in order to obtain the region in which the digital value is saturated, there is a problem that the method cannot be used for real-time estimation.

Therefore, the present invention has been made in view of the above problems, and an object of the present invention is to provide an error rate measurement apparatus and an error rate measurement method with which it is possible to adjust a threshold voltage between symbol levels in real time using an error decision result during measurement.

Means for Solving the Problem

In order to achieve the above object, an error rate measurement apparatus according to Claim 1 of the present invention includes:

an error count unit 13*a* that calculates an error count value by determining an error with respect to expected symbol levels of a PAM signal with two or more levels; and a control unit 6 that adjusts and controls a threshold voltage for each interval between the symbol levels, in which the error count unit calculates a first error count value obtained by determining an error lower than the expected symbol levels of the PAM signal and a second error count value obtained by determining an error higher than the expected symbol levels of the PAM signal in a certain time for each interval between adjacent symbol levels of the PAM signal in a state in which the threshold voltage is set in an error region for each interval between the adjacent symbol levels of the PAM signal with two or more levels, and the control unit adjusts and controls the threshold voltage for each interval between the symbol levels such that the first error count value and the second error count value for each interval between the adjacent symbol levels calculated by the error count unit are close to each other.

In the error rate measurement apparatus according to Claim 2 of the present invention, a ratio between the first error count value and the second error count value for each interval between the adjacent symbol levels is close to 1:1.

In the error rate measurement apparatus according to Claim 3 of the present invention, the control unit includes an evaluation function calculation unit 6*a* that calculates an evaluation function, which is a function that is asymptotic to +1 in a case where the threshold voltage is misaligned upward, is asymptotic to −1 in a case where the threshold voltage is misaligned downward, and is 0 in a case where the threshold voltage is balanced, based on a total number of symbols measured in the certain time, and the control unit determines whether or not an absolute value of the evaluation function is smaller than a predetermined value.

In the error rate measurement apparatus according to Claim 4 of the present invention, the control unit includes an evaluation function calculation unit 6*a* that calculates an evaluation function, which is a function that is asymptotic to +1 in a case where the threshold voltage is misaligned upward, is asymptotic to −1 in a case where the threshold voltage is misaligned downward, and is 0 in a case where the threshold voltage is balanced, based on a total number of symbols measured in the certain time, and the control unit determines whether or not an absolute value of the evaluation function is smaller than a predetermined value.

In the error rate measurement apparatus according to Claim 5 of the present invention, whether or not the first error count value and the second error count value for each interval between the adjacent symbol levels are close to each other corresponds to whether or not the absolute value of the evaluation function is minimum.

In the error rate measurement apparatus according to Claim 6 of the present invention, whether or not the first error count value and the second error count value for each interval between the adjacent symbol levels are close to each other corresponds to whether or not the absolute value of the evaluation function is minimum.

An error rate measurement method according to Claim 7 of the present invention includes:

a step of calculating an error count value using an error count unit 13*a* by determining an error with respect to expected symbol levels of a PAM signal with two or more levels; and a step of adjusting and controlling a threshold voltage for each interval between the symbol levels, in which the step of calculating using the error count unit is step ST6 of calculating, using the error count unit, a first error count value obtained by determining an error lower than the expected symbol levels of the PAM signal and a second error count value obtained by determining an error higher than the expected symbol levels of the PAM signal in a certain time for each interval between adjacent symbol levels of the PAM signal in a state in which the threshold voltage is set in an error region for each interval between the adjacent symbol levels of the PAM signal with two or more levels, and the step of adjusting and controlling the threshold voltage for each interval between the symbol levels includes step ST10 of adjusting and controlling, using the control unit 6, the threshold voltage for each interval between the symbol levels such that the first error count value and the second error count value for each interval between the adjacent symbol levels calculated by the error count unit are close to each other.

In the error rate measurement method according to Claim 8 of the present invention, a ratio between the first error count value and the second error count value for each interval between the adjacent symbol levels is close to 1:1.

In the error rate measurement method according to Claim 9 of the present invention, the control unit calculates an evaluation function, which is a function that is asymptotic to +1 in a case where the threshold voltage is misaligned upward, is asymptotic to −1 in a case where the threshold voltage is misaligned downward, and is 0 in a case where the threshold voltage is balanced, based on a total number of symbols measured in the certain time, and the control unit determines whether or not an absolute value of the evaluation function is smaller than a predetermined value.

In the error rate measurement method according to Claim 10 of the present invention, the control unit calculates an evaluation function, which is a function that is asymptotic to +1 in a case where the threshold voltage is misaligned upward, is asymptotic to −1 in a case where the threshold voltage is misaligned downward, and is 0 in a case where the threshold voltage is balanced, based on a total number of symbols measured in the certain time, and the control unit determines whether or not an absolute value of the evaluation function is smaller than a predetermined value.

In the error rate measurement method according to Claim 11, whether or not the first error count value and the second error count value for each interval between the adjacent symbol levels are close to each other corresponds to whether or not the absolute value of the evaluation function is minimum.

In the error rate measurement method according to Claim 12, whether or not the first error count value and the second error count value for each interval between the adjacent symbol levels are close to each other corresponds to whether or not the absolute value of the evaluation function is minimum.

Advantage of the Invention

According to the present invention, it is possible to adjust a threshold voltage Vth between symbol levels in real time in a direction in which errors decrease using estimation based on an error decision result during measurement.

BEST MODE FOR CARRYING OUT THE INVENTION

Hereinafter, an embodiment for implementing the present invention will be described in detail with reference to the accompanying drawings.

SUMMARY OF THE PRESENT INVENTION

An error rate measurement apparatus and an error rate measurement method according to the present invention employ a method focusing on a distribution of error counts of bits or symbols, and have a function of automatically adjusting a threshold voltage Vth in real time with respect to a certain PAM signal with two or more levels including an NRZ signal.

First, in order to facilitate understanding of the function of the present invention, a case where an NRZ signal with two levels is used will be described with reference to FIG. 6.

Figure 6:
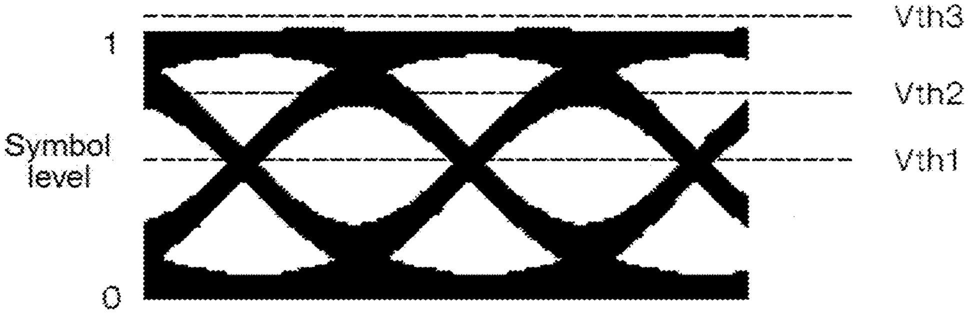
FIG. 6 is a diagram showing an example of a relationship between symbol levels 0 and 1 of an NRZ signal and threshold voltages Vth1, Vth2, and Vth3.

In FIG. 6, the optimum threshold voltage Vth is Vth1, but in a case where the optimum threshold voltage Vth is moved upward and set to, for example, Vth2, a frequency of erroneously determining a bit that is at a symbol level 1 as being at a symbol level 0 increases. Then, in a case where the threshold voltage Vth is further moved upward and reaches Vth3, all the bits that are expectedly at the symbol level 1 are erroneously determined to be at the symbol level 0.

As described above, an error of incorrectly determining a bit that is expectedly to be at the symbol level 1 as being at the symbol level 0 is referred to as an omission error, and an error of incorrectly determining in an opposite manner is referred to as an insertion error. Here, for expansion to a PAM signal described later, the omission error is expressed as L1_Omission, and the insertion error is expressed as L0_Insertion.

Next, in FIG. 6, considering that the threshold value Vth is moved downward from Vth1, L0_Insertion in which a bit that is at the symbol level 0 is erroneously recognized as being at the symbol level 1 is increased. From these, it can be considered that it is possible to estimate whether the current threshold voltage Vth is misaligned upward or downward by evaluating which of L0_Insertion or L1_Omission is dominant. Then, and a point to which the threshold voltage Vth is moved by estimation and at which a ratio between L0_Insertion and L1_Omission is balanced is regarded as an optimum point of the threshold voltage Vth.

Figure 5:
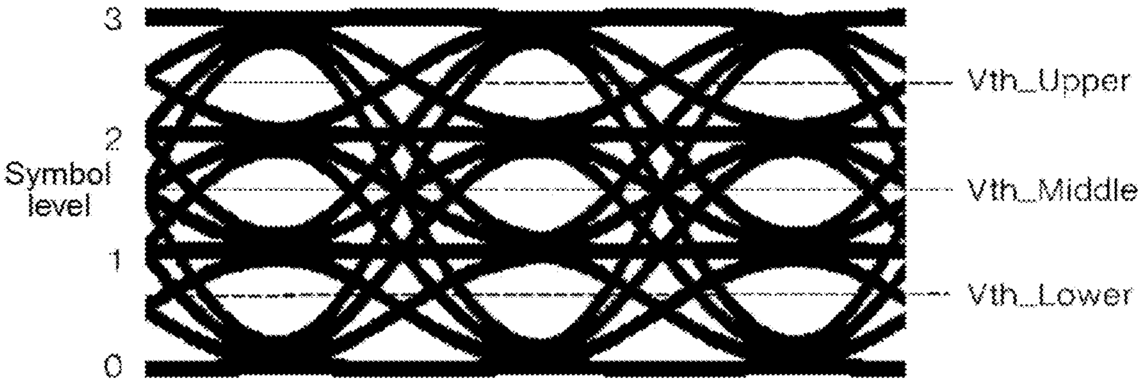
FIG. 5 is a diagram showing an example of a relationship between symbol levels 0, 1, 2, and 3 of a PAM4 signal and threshold voltages Vth_Upper, Vth_Middle, and Vth_Lower.

Next, this is applied to a PAM4 signal. For example, in a case of a PAM4 signal in FIG. 5, the threshold voltages Vth (Vth_Upper, Vth_Middle, Vth_Lower) can be estimated from the respective error counts shown below.

An error determined to be lower than an expected symbol level 3 of the PAM4 signal is expressed as L3_Omission, an error determined to be lower than an expected symbol level 2 of the PAM4 signal is expressed as L2_Omission, and an error determined to be lower than an expected symbol level 1 of the PAM4 signal is expressed as L1_Omission.

In contrast, an error determined to be higher than the expected symbol level 2 of the PAM4 signal is expressed as L2_Insertion, an error determined to be higher than the expected symbol level 1 of the PAM4 signal is expressed as L1_Insertion, and an error determined to be higher than the expected symbol level 0 of the PAM4 signal is expressed as L0_Insertion.

Vth_Upper: L3_Omission and L2_Insertion

Vth_Middle: L2_Omission and L1_Insertion

Vth_Lower: L1_Omission and L0_Insertion

More specifically, in a case where a total number of symbols measured per certain time is denoted by Symbol_total, a function that is asymptotic to +1 in a case where the threshold voltage Vth (Vth_Upper, Vth_Middle, Vth_Lower) is misaligned upward, is asymptotic to −1 in a case where the threshold voltage Vth is misaligned downward, and is 0 in a case where the threshold voltage Vth is balanced can be implemented by using the following calculation expressions (Expressions (1) to (3)). In the present embodiment, the function is defined as an evaluation function.

$$Vth\_Upper: (L3\_Omission-L2\_Insertion)/Symbol\_total \quad \text{Expression (1)}$$

The threshold voltage Vth_Upper is calculated by subtracting the number of errors determined to be higher than the expected symbol level 2 of the PAM4 signal from the number of errors determined to be lower than the expected symbol level 3 of the PAM4 signal using Expression (1), and dividing the value by the total number of symbols.

$$Vth\_Middle: (L2\_Omission-L1\_Insertion)/Symbol\_total \quad \text{Expression (2)}$$

The threshold voltage Vth_Middle is calculated by subtracting the number of errors determined to be higher than the expected symbol level 1 of the PAM4 signal from the number of errors determined to be lower than the expected symbol level 2 of the PAM4 signal using Expression (2), and dividing the value by the total number of symbols.

$$Vth\_Lower: (L1\_Omission-L0\_Insertion)/Symbol\_total \quad \text{Expression (3)}$$

The threshold voltage Vth_Lower is calculated by subtracting the number of errors determined to be higher than the expected symbol level 0 of the PAM4 signal from the number of errors determined to be lower than the expected symbol level 1 of the PAM4 signal using Expression (3), and dividing the value by the total number of symbols.

[Configuration of Error Rate Measurement Apparatus]

Next, a configuration of the error rate measurement apparatus in a case where the threshold voltage of the PAM4 signal described above is automatically adjusted will be described with reference to FIG. 1.

Figure 1:
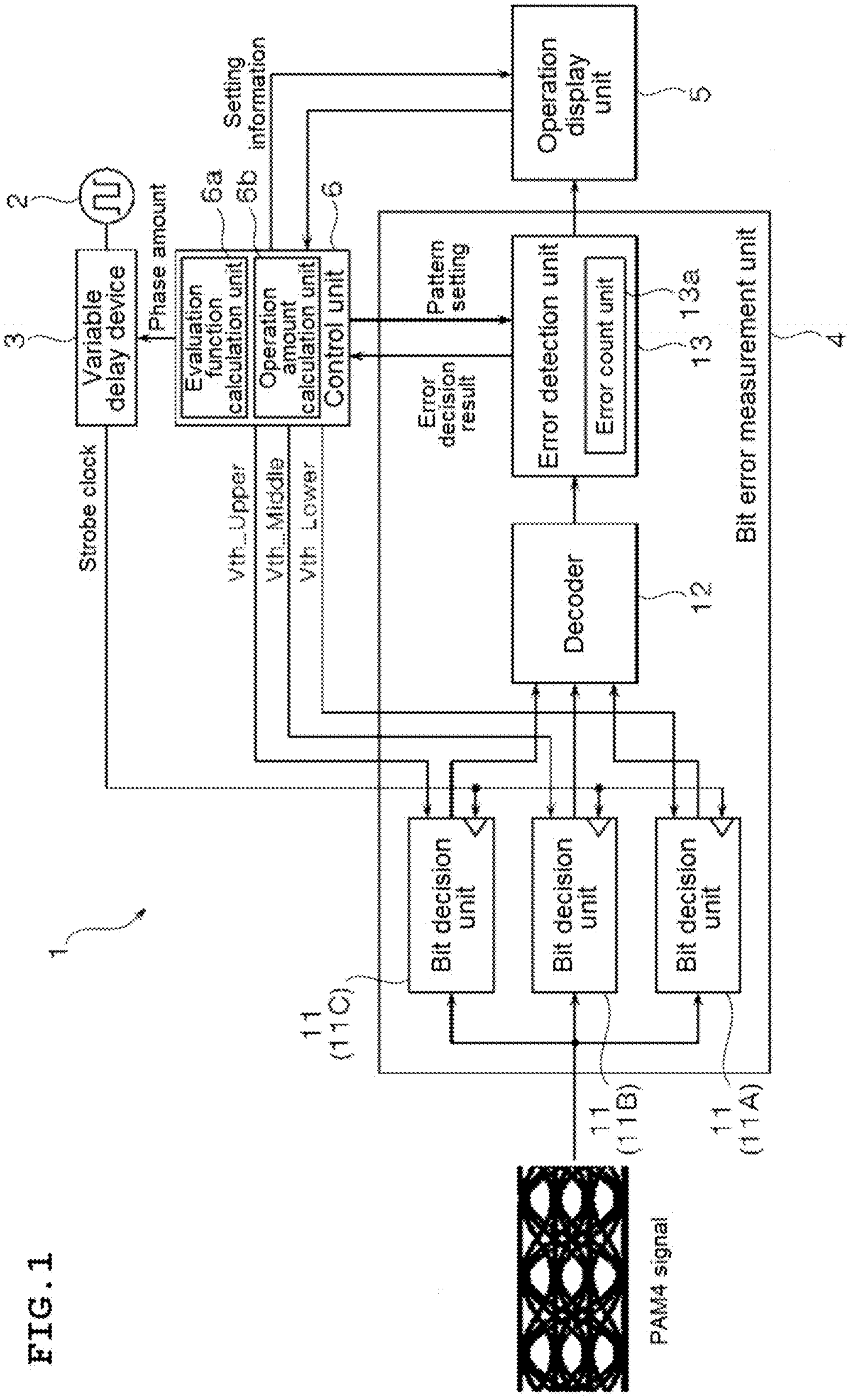
FIG. 1 is a block diagram showing an internal configuration of an error rate measurement apparatus according to the present invention.
Figure 2:
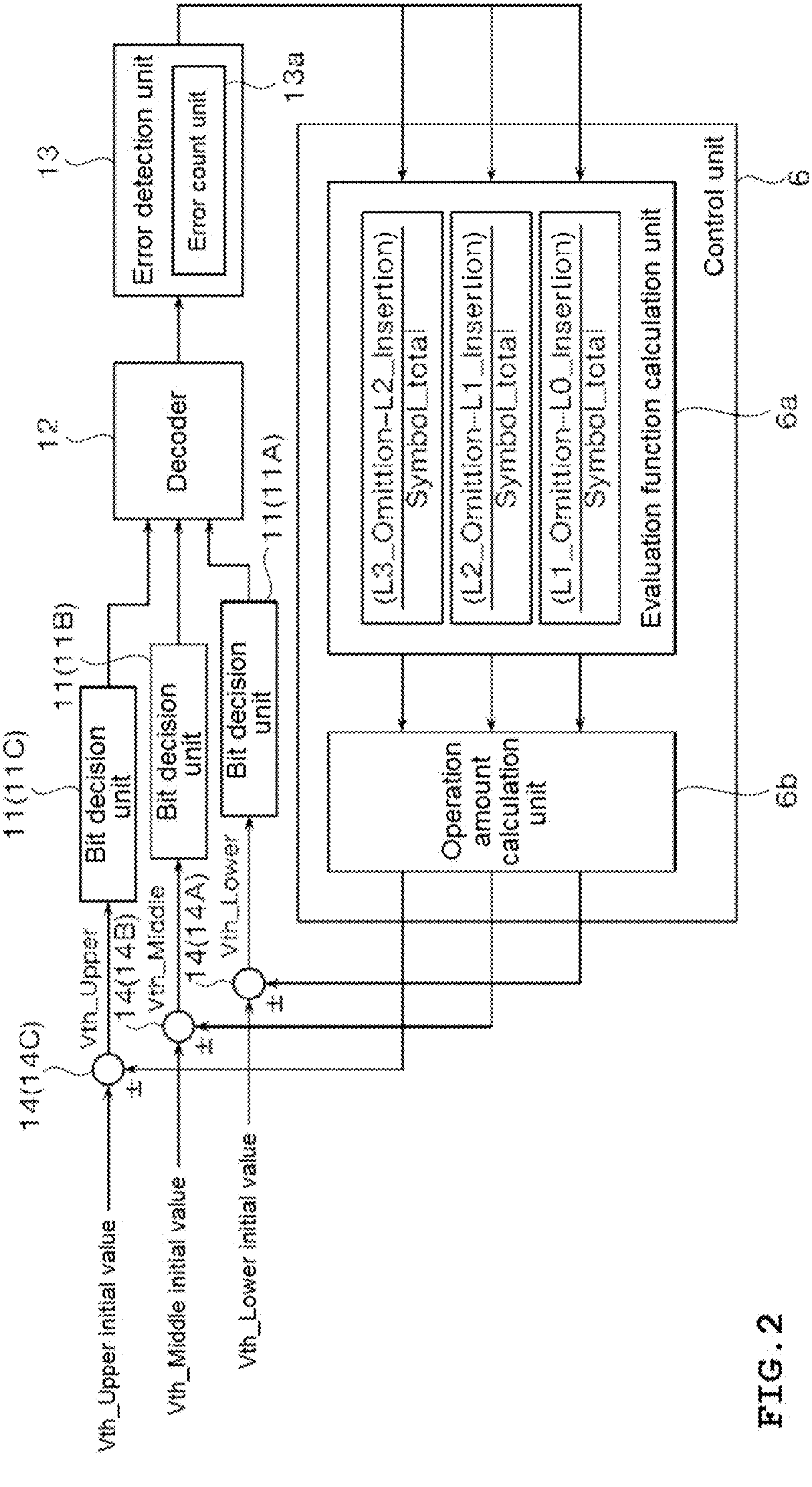
FIG. 2 is a block diagram related to an automatic adjustment function (Auto Adjust) for a threshold voltage in FIG. 1.

As shown in FIG. 1, an error rate measurement apparatus 1 is schematically configured by including a clock source 2, a variable delay device 3, a bit error measurement unit 4, an operation display unit 5, and a control unit 6. In addition, as shown in FIG. 1, the bit error measurement unit 4 includes bit decision units 11 (11A, 11B, 11C), a decoder 12, and an error detection unit 13. Further, as shown in FIG. 2, threshold voltage adjustment units 14 (14A, 14B, 14C) are provided between the control unit 6 and each bit decision unit 11 (11A, 11B, 11C).

The clock source 2 generates a clock of a reference frequency and inputs the generated clock of the reference frequency to the variable delay device 3.

In a case where the clock of the reference frequency from the clock source 2 is controlled by the control unit 6 with a set phase amount, the variable delay device 3 inputs a strobe clock based on the phase amount to each bit decision unit 11 (11A, 11B, 11C).

The bit decision units 11 corresponding to the number of eyes of the PAM signal are included. Here, since the PAM4 signal is used as a target signal, three bit decision units 11 (11A, 11B, 11C) are included.

Each of the bit decision units 11A, 11B, and 11C includes an input terminal for a determination threshold voltage of the bit decision and a strobe clock controlled by the control unit 6. The strobe clock is a clock synchronized with the PAM signal (data signal), and a strobe phase is adjusted by controlling an amount of delay of the variable delay device 3 with the control unit 6.

The decoder 12 decodes the results obtained by each bit decision unit 11 (11A, 11B, 11C) into a decision result as a PAM symbol.

The error detection unit 13 includes an error count unit 13*a*, and detects an error by comparing the decision result as the PAM symbol decoded by the decoder 12 at a certain time (or a measurement time set in advance) with a reference pattern sequence. Regarding the error detection, error identification including information on an expected symbol and an actually determined symbol, as expressed by L3_Omission described above, is performed in addition to the number of errors.

In a case where the error detection unit 13 detects an error at a certain time (or a measurement time), the error count unit 13*a* counts an error lower than the expected symbol level of the PAM4 signal (L3_Omission, L2_Omission, L1_Omission) and an error higher than the expected symbol level of the PAM4 signal (L2_Insertion, L1_Insertion, L0_Insertion) for each interval between adjacent symbol levels (between the symbol levels 0-1, 1-2, and 2-3).

Then, a first error count value obtained by determining an error lower than the expected symbol level of the PAM4 signal (an error count value of L3_Omission, L2_Omission, and L1_Omission) and a second error count value obtained by determining an error higher than the expected symbol level of the PAM4 signal (an error count value of L2_Insertion, L1_Insertion, and L0_Insertion) are calculated for each interval between adjacent symbol levels (between the symbol levels 0-1, 1-2, and 2-3).

The threshold voltage adjustment unit 14 (14A, 14B, 14C) consists of an adder and subtractor, and adds or subtracts a voltage adjustment amount (adjustment amount) of the corresponding threshold voltage Vth calculated by an adjustment amount calculation unit 6*b*, which will be described later, of the control unit 6 to and from an initial value of the threshold voltage Vth (Vth_Upper, Vth_Middle, Vth_Lower). Specifically, the threshold voltage adjustment unit 14A adds or subtracts the voltage adjustment amount (adjustment amount) of the threshold voltage Vth_Upper calculated by the adjustment amount calculation unit 6*b* to and from the initial value of the threshold voltage Vth_Upper. The threshold voltage adjustment unit 14B adds or subtracts the voltage adjustment amount (adjustment amount) of the threshold voltage Vth_Middle calculated by the adjustment amount calculation unit 6*b* to and from the initial value of the threshold voltage Vth_Middle. The threshold voltage adjustment unit 14C adds or subtracts the voltage adjustment amount (adjustment amount) of the threshold voltage Vth_Lower calculated by the adjustment amount calculation unit 6*b* to and from the initial value of the threshold voltage Vth_Lower.

The operation display unit 5 has both a function of an operation unit implemented by various keys, switches, buttons, soft keys on a display screen, and the like equipped in a main body of the error rate measurement apparatus 1, and a function of a display unit by a display device such as liquid a crystal display, an electroluminescence (EL) display, and a CRT.

The operation display unit 5 receives an operation input of various types of information necessary for automatic adjustment of the threshold voltage Vth of the PAM signal and error rate measurement (for example, the initial value of the threshold voltage Vth (Vth_Upper, Vth_Middle, Vth_Lower), the phase amount (delay device operation amount), a pattern sequence, and an ON/OFF state of an automatic adjustment function (Auto Adjust) of the threshold voltage Vth) from a user, and, under the control of the control unit 6, displays a setting item screen for setting the various information or a measurement result screen, and displays an operation target such as a button, a soft key, a pull-down menu, and an input box for setting various conditions on the setting item screen.

In the present embodiment, the operation display unit 5 is shown as the configuration in which both the operation unit and the display unit are included, but the operation display unit 5 may have a configuration in which the operation unit and the display unit are separate.

As shown in FIGS. 1 and 2, the control unit 6 includes an evaluation function calculation unit 6*a* and the adjustment amount calculation unit 6*b*.

The evaluation function calculation unit 6*a* calculates the evaluation function for each of the above-described threshold voltages Vth (Vth_Upper, Vth_Middle, Vth_Lower) from the detection result of the error count value of the error count unit 13*a*.

The adjustment amount calculation unit 6*b* estimates a misalignment of the threshold voltage Vth (Vth_Upper, Vth_Middle, Vth_Lower) using the evaluation function for each threshold voltage Vth (Vth_Upper, Vth_Middle, Vth_Lower) calculated by the evaluation function calculation unit 6*a*, and calculates the voltage adjustment amount (adjustment amount) for each threshold voltage Vth (Vth_Upper, Vth_Middle, Vth_Lower) from an estimation result.

Then, the control unit 6 integrally controls the variable delay device 3, the operation display unit 5, the bit decision units 11 (11A, 11B, 11C), and the error detection unit 13 in order to perform the automatic adjustment of the threshold voltage Vth described later.

Specifically, the control unit 6 performs operation input control of the operation display unit 5 for various types of information necessary for the automatic adjustment of the threshold voltage Vth of the PAM signal and the error rate measurement (for example, the initial value of the threshold voltage Vth (Vth_Upper, Vth_Middle, Vth_Lower), the phase amount (delay device operation amount), the pattern sequence, and the ON/OFF state of the automatic adjustment function (Auto Adjust) of the threshold voltage Vth), display control of the operation display unit 5 for the setting item screen, the measurement result screen, and the like, control of the variable delay device 3 with the set phase amount (delay device operation amount), the input control of the initial value of the threshold voltage Vth (Vth_Upper, Vth_Middle, Vth_Lower) input to the bit decision unit 11 (11A, 11B, 11C) or the voltage adjustment amount (adjustment amount) calculated by the adjustment amount calculation unit 6*b* to the threshold voltage adjustment unit 14 (14A, 14B, 14C), input control of the pattern sequence to the error detection unit 13, determination of whether or not a ratio between the first error count value and the second error count value for each interval between the symbol levels is closest to 1:1 (or whether or not an absolute value of the evaluation function is minimum), and the like.

[Automatic Adjustment Method for Threshold Voltage Vth]

Figure 3:
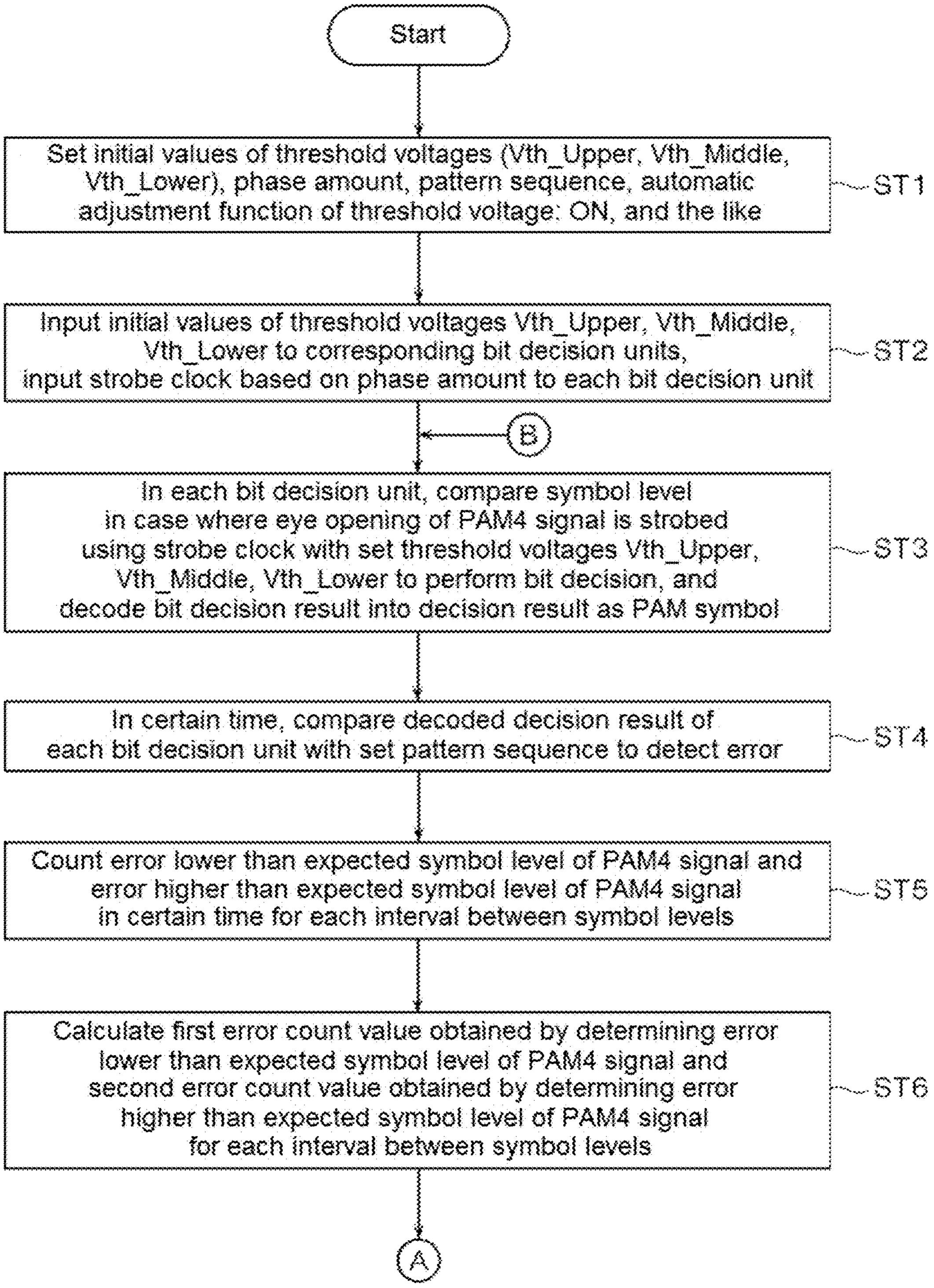
FIG. 3 is a flowchart of an automatic adjustment method for a threshold voltage using the error rate measurement apparatus according to the present invention.

Next, a method of automatically adjusting the threshold voltage Vth of the PAM4 signal with the error rate measurement apparatus 1 configured as described above will be described with reference to FIGS. 3 and 4.

In automatically adjusting the threshold voltage Vth of the PAM4 signal, the operation display unit 5 sets the initial value of the threshold voltage Vth (Vth_Upper, Vth_Middle, Vth_Lower), the phase amount (delay device operation amount), the pattern sequence, the automatic adjustment function (Auto Adjust): ON of the threshold voltage Vth, and the like (ST1).

The initial value of the threshold voltage Vth is set in an error region for each interval between the adjacent symbol levels of the PAM4 signal (between symbol levels 0-1, 1-2, and 2-3 of the PAM4 signal). That is, the initial value of the threshold voltage Vth_Lower is set within an error region between the symbol levels 0-1 of the PAM4 signal, the initial value of the threshold voltage Vth_Middle is set within an error region between the symbol levels 1-2 of the PAM4 signal, and the initial value of the threshold voltage Vth Upper is set within an error region between the symbol levels 2-3 of the PAM4 signal.

In addition, in the present embodiment, the bit decision unit 11 (11A, 11B, 11C) and the decoder 12 are always operated, but the user can also set a certain measurement time with the operation display unit 5.

After the above setting is performed, in a case where the measurement of the PAM4 signal is started, the control inputs the initial value of the set threshold voltage Vth (Vth_Upper, Vth_Middle, Vth_Lower) to the corresponding bit decision unit 11 (11A, 11B, 11C), and controls the variable delay device 3 with the set phase amount. Accordingly, the variable delay device 3 inputs the strobe clock based on the phase amount to each bit decision unit 11 (11A, 11B, 11C) (ST2).

Then, each bit decision unit 11 (11A, 11B, 11C) compares a symbol level in a case where a predetermined position of the eye opening of the PAM4 signal in a time axis direction is strobed using the strobe clock from the variable delay device 3, with the set threshold voltage Vth (Vth_Upper, Vth_Middle, Vth_Lower: the initial value in the first time and a value after adjustment obtained by adding and subtracting the voltage adjustment amount (adjustment amount) to and from the initial value in the second and subsequent times), and performs the bit decision (ST3).

Subsequently, the decoder 12 decodes the bit decision result of each bit decision unit 11 (11A, 11B, 11C) into the decision result as the PAM symbol (ST3).

Then, the error detection unit 13 compares the decoded decision result of each bit decision unit 11 (11A, 11B, 11C) with the set pattern sequence at a certain time (or a measurement time set in advance) to determine presence or absence of an error and detect the error (ST4).

In addition, the error count unit 13*a* counts an error lower than the expected symbol level of the PAM4 signal (L3_Omission, L2_Omission, L1_Omission) and an error higher than the expected symbol level of the PAM4 signal (L2_Insertion, L1_Insertion, L0_Insertion) at a certain time (or a measurement time) based on the decision result of the error detection unit 13 for each interval between the symbol levels (between the symbol levels 0-1, 1-2, and 2-3) (ST5).

Then, the error count unit 13*a* calculates the first error count value obtained by determining an error lower than the expected symbol level of the PAM4 signal (the error count value of L3_Omission, L2_Omission, and L1_Omission) and the second error count value obtained by determining an error higher than the expected symbol level of the PAM4 signal (the error count value of L2_Insertion, L1_Insertion, and L0_Insertion) for each interval between the adjacent symbol levels (between the symbol levels 0-1, 1-2, and 2-3) (ST6).

Subsequently, the evaluation function calculation unit 6*a* of the control unit 6 calculates the evaluation function for each of above-described threshold voltages: Vth_Upper, Vth_Middle, and Vth_Lower from the detection result of the error count value of the error count unit 13*a* (ST7).

Then, the adjustment amount calculation unit 6*b* of the control unit 6 estimates a direction of the misalignment of the threshold voltage Vth (Vth_Upper, Vth_Middle, Vth_Lower) and presence or absence of convergence using the evaluation function calculated by the evaluation function calculation unit 6*a*, and calculates the voltage adjustment amount (adjustment amount) for each threshold voltage Vth (Vth_Upper, Vth_Middle, Vth_Lower) from the estimation result (ST8).

Thereafter, the control unit 6 inputs the voltage adjustment amount (adjustment amount) for each threshold voltage Vth (Vth_Upper, Vth_Middle, Vth_Lower) to the corresponding threshold voltage adjustment unit 14 (14A, 14B, 14C). Accordingly, the threshold voltage adjustment unit 14 (14A, 14B, 14C) adds and subtracts the voltage adjustment amount (adjustment amount) of the corresponding threshold voltage Vth (Vth_Upper, Vth_Middle, Vth_Lower) to and from the currently set threshold voltage Vth to automatically adjust and newly set the threshold voltage Vth (Vth_Upper, Vth_Middle, Vth_Lower) (ST9).

Then, until the control unit 6 determines that the ratio between the first error count value and the second error count value for each interval between symbol levels calculated by the error count unit 13*a* is closest to 1:1 (or the absolute value of the evaluation function is minimum) (ST10—Yes), the processing of ST3 to ST9 is repeated, and the automatic adjustment of the threshold voltage Vth (Vth_Upper, Vth_Middle, Vth_Lower) is executed under the control of the control unit 6. In a case where the user performs an operation of ending the automatic adjustment of the threshold voltage Vth from the operation display unit 5 (ST11—Yes), the processing of the automatic adjustment of the threshold voltage Vth is ended.

Figure 4:
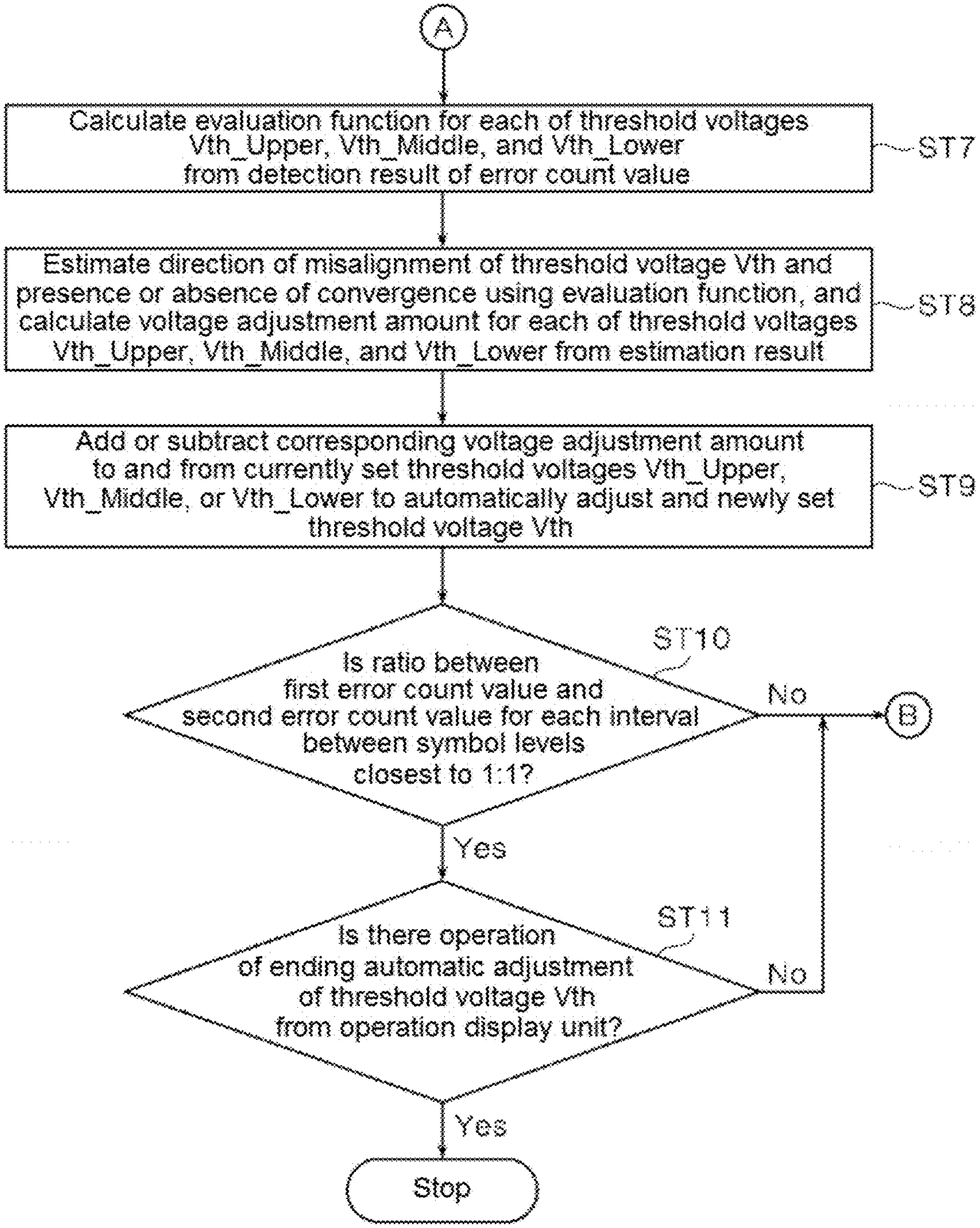
FIG. 4 is a flowchart of the automatic adjustment method for a threshold voltage using the error rate measurement apparatus according to the embodiment of the present invention, following FIG. 3.

It is also possible to execute the automatic adjustment of the threshold voltage Vth (Vth_Upper, Vth_Middle, Vth_Lower) by repeating the processing of ST3 to ST9 under the control of the control unit 6 such that the ratio between the first error count value and the second error count value for each interval between the symbol levels calculated by the error count unit 13*a* is closest to 1:1 (or the absolute value of the evaluation function is minimal) without performing the determination processing of ST10 in FIG. 4.

By the way, in the above-described embodiment, the case where the NRZ signal and the PAM4 signal are used has been described as an example, but the present invention is not limited thereto, and the same description can be made for any PAM signal.

In addition, as described above, the direction of the misalignment of the threshold voltage Vth and the convergence thereof are obtained in real time by the method of the present embodiment, and a position of the threshold voltage Vth is not directly obtained. Therefore, it is necessary to repeat the estimation of the direction of the misalignment of the threshold voltage Vth and the adjustment of the threshold voltage Vth several times until the convergence, and in a case where the current threshold voltage Vth is far from the optimum point, it may take time until the convergence.

Further, in the above-described embodiment, the threshold voltage Vth is adjusted with the estimation based on the error decision result during the measurement, and thus the threshold voltage Vth converges in an error-free region. Therefore, in a case where there are sufficient eye openings and the error-free region is wide, there is a possibility that a point misaligned from the center of the eye is estimated as the optimum point of the threshold voltage Vth and the adjustment is performed. Therefore, in a case where it is required not only to be error-free but also to be in the center of the error-free region, it is preferable to perform well-known processing in the related art in which, for example, the threshold voltage Vth is swept up and down until an error is detected and an intermediate point of a sweep result is obtained.

As described above, according to the present embodiment, the threshold voltage Vth between the symbol levels is adjusted with the estimation based on the error decision result during the measurement, so that the threshold voltage Vth between the symbol levels can be adjusted in real time in a certain PAM signal with two or more levels including the NRZ signal. In principle, the present method can be applied even in a case where the symbol levels 0, 1, 2, and 3 of the PAM4 signal are not evenly distributed or in a case where a median value thereof is not the optimum point of the threshold voltage Vth, and the threshold voltage Vth between the symbol levels can be adjusted in real time in a direction in which the error decreases.

In addition, since the threshold voltage Vth between the symbol levels is adjusted using the results of the bit decision units instead of separately providing a circuit for detecting the threshold voltage Vth, the bit error measurement unit 4 can implement the adjustment with the estimation of the threshold voltage using the same receiver device as a related error rate measurement apparatus. Accordingly, it is not necessary to consider a difference in characteristics between the circuit for the adjustment with the estimation of the threshold voltage Vth and the bit error measurement unit 4, it is possible to perform the adjustment correlated with the bit error, and a simple and inexpensive apparatus configuration is sufficient.

Hitherto, the best mode of the error rate measurement apparatus and the error rate measurement method according to the present invention has been described, but the present invention is not limited by the description and drawings according to this mode. That is, other modes, examples, operation techniques, and the like made by persons skilled in the art based on this mode are all included in the scope of the present invention.

DESCRIPTION OF REFERENCE NUMERALS AND SIGNS

1: error rate measurement apparatus
2: clock source
3: variable delay device
4: bit error measurement unit
5: operation display unit
6: control unit
6*a*: evaluation function calculation unit
6*b*: adjustment amount calculation unit
11 (11A, 11B, 11C): bit decision unit
12: decoder
13: error detection unit
13*a*: error count unit
14 (14A, 14B, 14C): threshold voltage adjustment unit

What is claimed is:

1. An error rate measurement apparatus comprising:

an error count unit that calculates an error count value by determining an error with respect to expected symbol levels of a PAM signal with two or more levels; and a control unit that adjusts and controls a threshold voltage for each interval between the symbol levels, wherein the error count unit calculates a first error count value obtained by determining an error lower than the expected symbol levels of the PAM signal and a second error count value obtained by determining an error higher than the expected symbol levels of the PAM signal in a certain time for each interval between adjacent symbol levels of the PAM signal in a state in which the threshold voltage is set in an error region for each interval between the adjacent symbol levels of the PAM signal with two or more levels, and the control unit adjusts and controls the threshold voltage for each interval between the symbol levels such that the first error count value and the second error count value for each interval between the adjacent symbol levels calculated by the error count unit are close to each other.

2. The error rate measurement apparatus according to claim 1, wherein a ratio between the first error count value and the second error count value for each interval between the adjacent symbol levels is close to 1:1.

3. The error rate measurement apparatus according to claim 2, wherein the control unit includes an evaluation function calculation unit that calculates an evaluation function, which is a function that is asymptotic to +1 in a case where the threshold voltage is misaligned upward, is asymptotic to −1 in a case where the threshold voltage is misaligned downward, and is 0 in a case where the threshold voltage is balanced, based on a total number of symbols measured in the certain time, and the control unit determines whether or not an absolute value of the evaluation function is smaller than a predetermined value.

4. The error rate measurement apparatus according to claim 3, wherein whether or not the first error count value and the second error count value for each interval between the adjacent symbol levels are close to each other corresponds to whether or not the absolute value of the evaluation function is minimum.

5. The error rate measurement apparatus according to claim 1, wherein the control unit includes an evaluation function calculation unit that calculates an evaluation function, which is a function that is asymptotic to +1 in a case where the threshold voltage is misaligned upward, is asymptotic to −1 in a case where the threshold voltage is misaligned downward, and is 0 in a case where the threshold voltage is balanced, based on a total number of symbols measured in the certain time, and the control unit determines whether or not an absolute value of the evaluation function is smaller than a predetermined value.

6. The error rate measurement apparatus according to claim 5, wherein whether or not the first error count value and the second error count value for each interval between the adjacent symbol levels are close to each other corresponds to whether or not the absolute value of the evaluation function is minimum.

7. An error rate measurement method comprising:

a step of calculating an error count value using an error count unit by determining an error with respect to expected symbol levels of a PAM signal with two or more levels; and a step of adjusting and controlling a threshold voltage for each interval between the symbol levels, wherein the step of calculating using the error count unit is a step of calculating, using the error count unit, a first error count value obtained by determining an error lower than the expected symbol levels of the PAM signal and a second error count value obtained by determining an error higher than the expected symbol levels of the PAM signal in a certain time for each interval between adjacent symbol levels of the PAM signal in a state in which the threshold voltage is set in an error region for each interval between the adjacent symbol levels of the PAM signal with two or more levels, and the step of adjusting and controlling the threshold voltage for each interval between the symbol levels includes a step of adjusting and controlling, using the control unit, the threshold voltage for each interval between the symbol levels such that the first error count value and the second error count value for each interval between the adjacent symbol levels calculated by the error count unit are close to each other.

8. The error rate measurement method according to claim 7, wherein a ratio between the first error count value and the second error count value for each interval between the adjacent symbol levels is close to 1:1.

9. The error rate measurement method according to claim 8, wherein the control unit calculates an evaluation function, which is a function that is asymptotic to +1 in a case where the threshold voltage is misaligned upward, is asymptotic to −1 in a case where the threshold voltage is misaligned downward, and is 0 in a case where the threshold voltage is balanced, based on a total number of symbols measured in the certain time, and the control unit determines whether or not an absolute value of the evaluation function is smaller than a predetermined value.

10. The error rate measurement method according to claim 8, wherein whether or not the first error count value and the second error count value for each interval between the adjacent symbol levels are close to each other corresponds to whether or not the absolute value of the evaluation function is minimum.

11. The error rate measurement method according to claim 7, wherein the control unit calculates an evaluation function, which is a function that is asymptotic to +1 in a case where the threshold voltage is misaligned upward, is asymptotic to −1 in a case where the threshold voltage is misaligned downward, and is 0 in a case where the threshold voltage is balanced, based on a total number of symbols measured in the certain time, and the control unit determines whether or not an absolute value of the evaluation function is smaller than a predetermined value.

12. The error rate measurement method according to claim 7, wherein whether or not the first error count value and the second error count value for each interval between the adjacent symbol levels are close to each other corresponds to whether or not the absolute value of the evaluation function is minimum.

* * * * *